United States Patent
Li et al.

(10) Patent No.: US 12,346,750 B2
(45) Date of Patent: Jul. 1, 2025

(54) BLOCKCHAIN-BASED INTERACTION METHOD AND SYSTEM FOR EDGE COMPUTING SERVICE

(71) Applicant: Chongqing University, Chongqing (CN)

(72) Inventors: Jian Li, Chongqing (CN); Yuxing Mao, Chongqing (CN); Yihang Xu, Chongqing (CN); Xueshuo Chen, Chongqing (CN); Xiong Xiong, Chongqing (CN); Simou Li, Chongqing (CN)

(73) Assignee: CHONGQING UNIVERSITY, Chongqing (CN)

( * ) Notice: Subject to any disclaimer, the term of this patent is extended or adjusted under 35 U.S.C. 154(b) by 533 days.

(21) Appl. No.: 17/849,979

(22) Filed: Jun. 27, 2022

(65) Prior Publication Data
US 2023/0040149 A1 Feb. 9, 2023

(30) Foreign Application Priority Data
Aug. 2, 2021 (CN) .......................... 202110880704.2

(51) Int. Cl.
G06F 9/50 (2006.01)
(52) U.S. Cl.
CPC .......... *G06F 9/5083* (2013.01); *G06F 9/5038* (2013.01)

(58) Field of Classification Search
None
See application file for complete search history.

(56) References Cited

U.S. PATENT DOCUMENTS

2020/0007414 A1* 1/2020 Smith ..................... H04L 67/12

* cited by examiner

*Primary Examiner* — Chat C Do
*Assistant Examiner* — William C Wood
(74) *Attorney, Agent, or Firm* — WPAT, PC

(57) ABSTRACT

A blockchain-based interaction method and system for an edge computing service: using, as a bearing entity of an MECaaS, a device that has an environment for an operating system and that is of a user; registering a computing power device of the user as an edge node by using the MECaaS; uploading or updating registration information of the edge node to a blockchain layer; issuing, by a requesting device as a data producer, a computing task to the MECaaS; invoking, by the MECaaS, the smart contract deployed on the blockchain layer; standardizing a data format of the computing task; matching a target edge node for the requesting device; establishing an M2M communication between the requesting device and the target edge node, so that the requesting device can transmit raw data to the target edge node, and the target edge node can feed back a computing result to the requesting device.

8 Claims, 10 Drawing Sheets

| Hash | From | To | Direction | +/- Amount | Date | Tx Fee |
|---|---|---|---|---|---|---|
| 0x0e24cc006dbe3cd14... | 0x423ac5c7638f89f0a626e041b66b... | 0x2a0dca2cce68d40c2523b1a5e29... | IN | 0 ETH | 21 minutes ago 29/03/21--04:01:31 UTC | 0.002219705 |
| 0x1e1309efbbb348f7e... | 0x3603853g2bcf88c8119004ga223b9... | 0x2a0dca2cce68d40c2523b1a5e29... | IN | 0 ETH | 29 minutes ago 29/03/21--03:53:59 UTC | 0.002236905 |
| 0x35dexbodc986deaaf7... | 0x423ac5c7638f89f0a626e041b66b... | 0x2a0dca2cce68d40c2523b1a5e29... | IN | 0 ETH | 32 minutes ago 29/03/21--03:51:07 UTC | 0.000631038 |
| 0xd00612387bb8ad8... | 0x98b79fbc1bfxadx6193a16c98c2... | 0x2a0dca2cce68d40c2523b1a5e29... | IN | 0 ETH | 44 minutes ago 29/03/21--03:38:24 UTC | 0.002236905 |
| 0x7dceae48024f0d9d2... | 0x423ac5c7638f89f0a626e041b66b... | 0x2a0dca2cce68d40c2523b1a5e29... | IN | 0 ETH | 3 days ago 25/03/21-09:50:59 UTC | 0.002253905 |

Blockchain layer: transaction record

FIG. 8A

```
Physical layer: computing result
Short address: 0x0001
msh >Receive Computing Task Successfully; Provide Service01}
Service01 Completed ! Return Data}
Short address: 0x0000
msh >gbk_send
Send Task to Target Terminal
msh >Receive Service01 Result Return Data From Computing Terminal Successfully
Receive Result Data:0xE4 0xBC 0xBD 0xE4 0xBE 0xBF 0xE4 0xC9 0xC1 0
xE4 0xC2 0xE4 0xC3 0xE4 0xC4 0xC5
```

FIG. 8C

BLOCKCHAIN-BASED INTERACTION METHOD AND SYSTEM FOR EDGE COMPUTING SERVICE

CROSS REFERENCE TO RELATED APPLICATION

This patent application claims the benefit and priority of Chinese Patent Application No. 202110880704.2, filed on Aug. 2, 2021, the disclosure of which is incorporated by reference herein in its entirety as part of the present application.

TECHNICAL FIELD

The present disclosure relates to the technical field of Internet of Things (IoT), and in particular, to the technical field of allocation of edge computing services.

BACKGROUND ART

In addition to edge nodes having computing power, there are also a large quantity of constrained devices in the IoT. The constrained devices are deficient in aspects of memory, CPU, computing resource, life cycle, and the like. Therefore, the constrained devices need to rely on a cloud computing technology or an edge computing technology.

Edge computing refers to providing a nearest-end service on one side near an object or a data source. During conventional edge computing, centralized cloud computing is decomposed into streams, and a computing task is allocated to one end closer to a data producer. In this way, a burden is relieved. The conventional edge computing depends on a centralized server for unified allocation when edge nodes are matched for constrained devices. Having a relatively heavy load, the centralized server is relatively slow in response and relatively low in efficiency. Moreover, once the centralized server becomes faulty, an edge computing service of the entire IoT is paralyzed. In addition, some computing requirements may involve private data, thereby having relatively high security requirements.

SUMMARY

To overcome defects of the above technology, the present disclosure provides a blockchain-based interaction method and system for an edge computing service, to solve a technical problem that allocating a computing service in the prior art relies on a centralized server.

To solve the above technical problem, the present disclosure provides a blockchain-based interaction method for an edge computing service, including the following steps:
  deploying a smart contract on a blockchain layer, where the smart contract is used to uniformly name preloaded programs, provide a uniform format for registration information of edge nodes, and provide a fair logic and an automatic asset transfer service;
  using, as a bearing entity of a multi-access edge computing as a service (MECaaS), a device that has an environment for an operating system and that is of a user; registering a computing power device of the user as an edge node (ECN) by using the MECaaS; and uploading or updating registration information of the edge node in a uniform format to the blockchain layer, where the registration information includes a node name, a node address, a service price, and task consumption time;
  issuing, by a requesting device as a data producer, a computing task to the MECaaS, where the computing task includes a name of a preloaded program, an address of the requesting device, delay sensitivity, and cost sensitivity;
  invoking, by the MECaaS, the smart contract; standardizing a data format of the computing task; and matching a target edge node for the requesting device by using a distributed decision-making algorithm;
  pushing the standardized computing task to a task queue of the target edge node;
  triggering an Ethereum event at the same time; and instructing the target edge node to confirm the Ethereum event;
  after the event is confirmed, triggering another Ethereum event; and issuing, by the requesting device, a communication code to the target edge node by using the MECaaS, to establish an M2M communication between the requesting device and the target edge node;
  transmitting, by the requesting device, raw data to the target edge node by using the M2M communication; and
  searching for and loading, by the target edge node, the preloaded program based on the name of the preloaded program; executing the preloaded program to perform computing on the raw data; feeding back a computing result to the requesting device; and triggering a contract event at the same time.

Further, the distributed decision-making algorithm includes the following steps: acquiring, by the requesting device, registration information of edge nodes by using the MECaaS based on the delay sensitivity and the cost sensitivity of the computing task; computing qualities of experience of the edge nodes; and automatically selecting, as the target edge node, an edge node with the best quality of experience from edge nodes whose occupancy states are idle.

Further, the quality of experience is computed according to the following formula: $E=\lambda_r^T*t+\lambda_r^C*p$, where E denotes a quality of experience provided by an edge node; $\lambda_r^T$ and $\lambda_r^C$ respectively denote the delay sensitivity and the cost sensitivity of the computing task; $\lambda_r^T$ and $\lambda_r^C$ are both constants; t denotes task consumption time by which the edge node completes the computing task; and p denotes a service price of the edge node.

Further, the quality of experience is computed according to the following formula: there are (n+1) edge nodes in total; the $n^{th}$ edge node is used as a fixed edge node; one of the other edge nodes is used as a variable edge node; a service price and task consumption time of the fixed edge node are fixed; a service price and task consumption time of the variable edge node are optimized to achieve a maximum profit; both the fixed edge node and the variable edge node have the potential to be selected as a target edge node when being in an idle state; whether an edge node is in the idle state is determined based on an occupancy time sequence of the edge node in a fixed time interval; and each moment in the occupancy time sequence of the edge node is an idle moment.

Further, the occupancy time sequence of the edge node in the fixed time interval is computed in the following manner:
  if task consumption time of any edge node is not an integral multiple of a task period, rounding up the task consumption time to an integer multiple of the task period;
  specifying service prices and task consumption time of n fixed edge nodes; computing corresponding qualities of experience, where a lower quality of experience indicates a higher priority; and ranking the n fixed edge nodes based on the qualities of experience;

determining occupancy time sequences of the n fixed edge nodes in a same fixed time interval according to the following principles:

(1) determining an occupancy time sequence, in the fixed time interval, of a fixed edge node with the highest priority based on task consumption time of the fixed edge node; and (2) among the other edge nodes, on the premise that an occupancy time sequence of an edge node does not conflict with an occupancy time sequence of another edge node that has a higher priority than the edge node, determining the occupancy time sequence of the edge node in the fixed time interval based on task consumption time of the edge node;

updating the service price and the task consumption time of the variable edge node, and comparing the quality of experience of the variable edge node with the qualities of experience of the n fixed edge nodes for priority ranking, where the quality of experience of the variable edge node is computed after each update; and on the premise that an occupancy time sequence of the variable edge node does not conflict with occupancy time sequences of all fixed edge nodes that have higher priorities than the variable edge node, determining the occupancy time sequence of the variable edge node in the fixed time interval based on the task consumption time of the variable edge node.

Further, a service price p of the variable edge node and consumption time t for completing the computing task are generated by using particle swarm optimal searching, to achieve a maximum profit R(p,t).

Further, a computational model of the maximum profit is as follows:

$$\max R(p, t) = (p - C(t)) * \varepsilon(p, t)$$

$$C(t) = \alpha_i^{\ln \frac{1}{n} \Sigma_i t_i}$$

$$\text{s.t} \begin{cases} t > t_m \\ p < p_m \end{cases}$$

in the formula, C(t) denotes cost; $\alpha_i$ denotes an inherent performance parameter of hardware of an $i^{th}$ fixed edge node; n denotes a total quantity of fixed edge nodes, where i={1, 2, ..., n}; $t_i$ denotes task consumption time by which the $i^{th}$ fixed edge node completes the computing task; $\varepsilon(p,t)$ denotes a quantity of tasks received by the variable edge node in the fixed time interval; and a length of the occupancy time sequence of the variable edge node is equal to the quantity $\varepsilon(p,t)$ of the tasks received by the variable edge node in the fixed time interval.

The present disclosure further provides a blockchain-based interaction system for an edge computing service. In the system, a blockchain layer and a physical layer are linked and coordinated by using an MECaaS.

The physical layer includes an IoT formed by various devices of different users, where devices of each user are classified into function-constrained devices and computing power devices.

The blockchain layer includes Ethereum used to support development of a smart contract, where the smart contract is deployed, through the Ethereum, to a blockchain network formed by distributed blocks.

A device that has an environment for an operating system and that is of a user is used as a bearing entity of the MECaaS, where the MECaaS includes an interaction unit (Interaction) and an operation unit (Operation).

The interaction unit is configured to provide operation access, so that a user can register his/her computing power device as an edge node, and upload information about the edge node to the blockchain network for storage. The MECaaS is further configured to: invoke, from the blockchain layer, a pre-deployed smart contract that meets a functional requirement; standardize the edge node by using the smart contract; request a naming-addressing protocol by using the smart contract; manage a transaction process of an edge computing service by using the smart contract; and finally, automatically match a target edge node for a requesting device according to a standardized computing task by using a distributed decision-making algorithm, and establish an M2M communication between the requesting device and the target edge node, so that the requesting device can transmit raw data to the target edge node, and the target edge node can feed back a computing result to the requesting device.

The operation unit is configured to configure and execute the distributed decision-making algorithm. The distributed decision-making algorithm includes the following steps: acquiring, by the requesting device, registration information of edge nodes by using the MECaaS based on the delay sensitivity and the cost sensitivity of the computing task; computing qualities of experience of completing the computing task; and automatically selecting, as the target edge node, an edge node with the best quality of experience from edge nodes whose occupancy states are idle.

Compared with the Prior Art, the Present Disclosure has the Following Beneficial Effects:

1. The present disclosure is independent of any centralized controller and any central computing node. Different from a conventional solution, an autonomous distributed decision-making algorithm is designed individually, to improve an existing software-as-a-service mode; and an MECaaS mode is designed to enable an IoT body, thereby building a fully distributed system.

2. In the present disclosure, an M2M communication is established between a requesting device and a target edge node, to overcome a communication barrier between heterogeneous devices, and provide high expansibility. Therefore, the present disclosure can be adaptive to computing scenarios of most IoT devices.

3. In the distributed decision-making algorithm of the present disclosure, a computing power service is allocated as required, to reduce cost of using the computing power service by the requesting device. In addition, a service price and task consumption time of a variable edge node are determined for achieving a maximum profit R(p,t), thereby achieving economic benefit conversion.

4. In the present disclosure, a blockchain technology is used to manage a transaction process of an edge computing service, thereby improving security and reliability.

5. The transaction process is recorded by triggering an Ethereum event and a contract event, thereby making the transaction process traceable.

BRIEF DESCRIPTION OF THE DRAWINGS

FIG. 8A is a schematic diagram illustrating a specific detail of a transaction on a blockchain layer according to an embodiment of the present disclosure;

FIG. 8C is a schematic diagram illustrating a computing result on a physical layer according to an embodiment of the present disclosure.

DETAILED DESCRIPTION OF THE EMBODIMENTS

1. Overview

Figure 1:
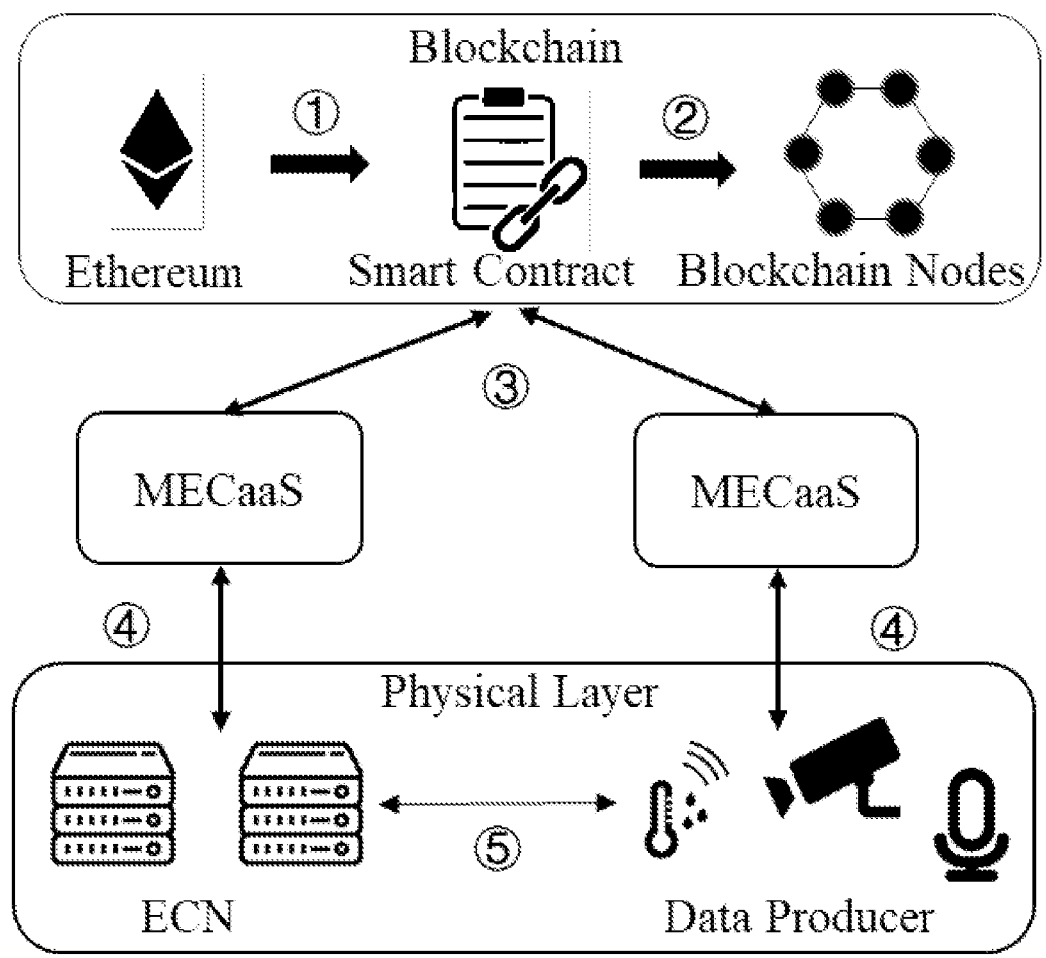
FIG. 1 is an architectural diagram of an edge computing system built based on an MECaaS.

Referring to FIG. 1, in a blockchain-based interaction system for an edge computing service, a blockchain layer and a physical layer are linked and coordinated by using an MECaaS.

The physical layer includes an IoT formed by various devices of different users, where devices of each user are classified into constrained devices and computing power devices. This layer includes various edge nodes (ECN) and constrained devices, which belong to different users and are heterogeneous in aspects of memory, CPU, data structure, communications protocol, and the like.

The blockchain layer includes Ethereum used to support development of a smart contract, where the smart contract is deployed, through the Ethereum, to a blockchain network formed by distributed blocks. The Ethereum is a blockchain platform. A developer may create any app being consensus, extensible, standardized, function-based, developable, and collaborative in the Ethereum. The concept "smart contract" mentioned herein is an Ethereum-based system that is originally used to automatically transfer a digital asset according to a pre-determined rule. A rule maker develops the smart contract in an Ethereum virtual machine (EVM) ①, and then deploys the smart contract to a (primary/test/local) network blockchain ②. A distributed node in the (primary/test/local) network blockchain guarantees execution of the smart contract.

Due to performance limitations, most of underlying nodes cannot interact directly with the smart contract. As a result, it is necessary to introduce the MECaaS. As bridges (③ and ④) (M2U) between the smart contract and physical nodes, the blockchain layer further provides a convenient operation access that may be but is not limited to a PC. Moreover, the blockchain layer implements an autonomous decision-making algorithm based on interaction information.

Figure 2:
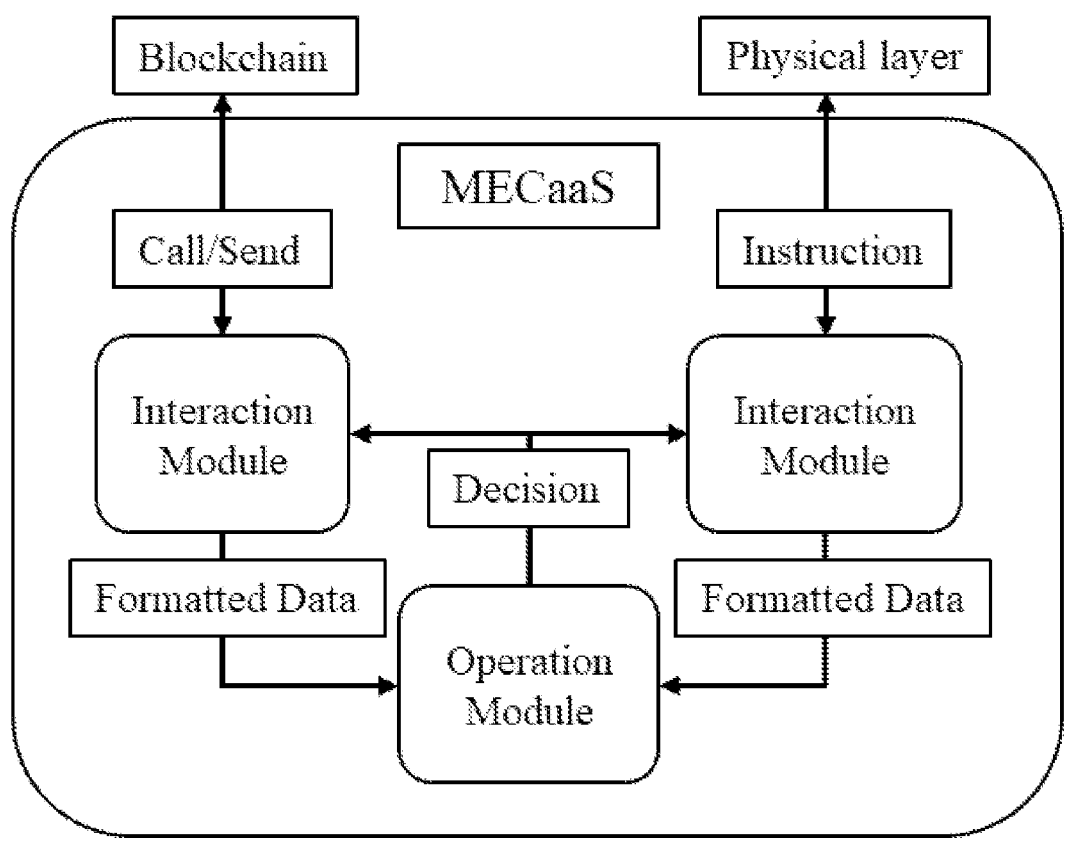
FIG. 2 is a diagram of internal components of an MECaaS and a flow direction of data commands.

Referring to FIG. 2, a device that has an environment for an operating system and that is of a user is used as a bearing entity of the MECaaS, where the MECaaS includes an interaction unit (Interaction) and an operation unit (Operation).

The interaction unit is configured to provide operation access, so that a user can register his/her computing power device as an edge node, and upload information about the edge node to the blockchain network for storage. The MECaaS is further configured to: invoke, from the blockchain layer, a pre-deployed smart contract that meets a functional requirement; standardize the edge node by using the smart contract; request a naming-addressing protocol by using the smart contract; manage a transaction process of an edge computing service by using the smart contract; and finally, automatically match a target edge node for a requesting device according to a standardized computing task by using a distributed decision-making algorithm, and establish an M2M communication between the requesting device and the target edge node, so that the requesting device can transmit raw data to the target edge node, and the target edge node can feed back a computing result to the requesting device;

The operation unit is configured to configure and execute the distributed decision-making algorithm. The distributed decision-making algorithm includes the following steps: acquiring, by the requesting device, registration information of edge nodes by using the MECaaS based on the delay sensitivity and the cost sensitivity of the computing task; computing qualities of experience of completing the computing task; and automatically selecting, as the target edge node, an edge node with the best quality of experience from edge nodes whose occupancy states are idle.

For a small-scale app, the distributed decision-making algorithm may be directly stored in the MECaaS. When a large-scale app is required, the distributed decision-making algorithm is stored in a distributed storage platform; and the MECaaS executes the distributed decision-making algorithm on the Internet by using an SaaS software application mode and acquires a result for matching between the requesting device and the target edge node.

A blockchain-based interaction method for an edge computing service includes the following steps:

deploying a smart contract on a blockchain layer, where the smart contract is used to uniformly name preloaded programs, provide a uniform format for registration information of edge nodes, and provide a fair logic and an automatic asset transfer service;

registering the edge nodes by using an MECaaS; and uploading registration information of the edge nodes in a uniform format to the blockchain layer, where the registration information includes a node name, a node address, an occupancy state, a service price, and consumption time for completing the computing task; and the service price and the consumption time for completing the computing task can be updated when the computing task changes;

issuing, by a requesting device as a data producer, a computing task to the MECaaS, where the computing task includes a name of a preloaded program, an address of the requesting device, delay sensitivity, and cost sensitivity;

invoking, by the MECaaS, the smart contract; standardizing a data format of the computing task; and matching a target edge node for the requesting device by using a distributed decision-making algorithm;

pushing the standardized computing task to a task queue of the target edge node;

triggering an Ethereum event at the same time; and instructing the target edge node to confirm the Ethereum event;

after the event is confirmed, triggering another Ethereum event; and issuing a communication code to the target edge node, to establish an M2M communication between the requesting device and the target edge node;

transmitting, by the requesting device, raw data to the target edge node by using the M2M communication; and searching for and loading, by the target edge node, the preloaded program based on the name of the preloaded program; executing the preloaded program to perform computing on the raw data; feeding back a computing result to the requesting device; and triggering a contract event at the same time.

The distributed decision-making algorithm includes the following steps: acquiring, by the requesting device, registration information of edge nodes by using the MECaaS based on the delay sensitivity and the cost sensitivity of the computing task; computing qualities of experience of the edge nodes; and automatically selecting, as the target edge node, an edge node with the best quality of experience from edge nodes whose occupancy states are idle.

The quality of experience is computed according to the following formula: $E=\lambda_r^T*t+\lambda_r^C*p$, where E denotes a quality of experience provided by an edge node; $\lambda_r^T$ and $\lambda_r^C$ respectively denote the delay sensitivity and the cost sensitivity of the computing task; $\lambda_r^T$ and $\lambda_r^C$ are both constants; t denotes task consumption time by which the edge node completes the computing task; and p denotes a service price of the edge node.

There are (n+1) edge nodes in total; the nth edge node is used as a fixed edge node; one of the other edge nodes is used as a variable edge node; a service price and task consumption time of the fixed edge node are fixed; a service price and task consumption time of the variable edge node are optimized to achieve a maximum profit; both the fixed edge node and the variable edge node have the potential to be selected as a target edge node when being in an idle state; whether an edge node is in the idle state is determined based on an occupancy time sequence of the edge node in a fixed time interval; and each moment in the occupancy time sequence of the edge node is an idle moment.

The occupancy time sequence of the edge node in the fixed time interval is computed in the following manner:

if task consumption time of any edge node is not an integral multiple of a task period, rounding up the task consumption time to an integer multiple of the task period;

specifying service prices and task consumption time of n fixed edge nodes; computing corresponding qualities of experience, where a lower quality of experience indicates a higher priority; and ranking the n fixed edge nodes based on the qualities of experience;

determining occupancy time sequences of the n fixed edge nodes in a same fixed time interval according to the following principles:

(1) determining an occupancy time sequence, in the fixed time interval, of a fixed edge node with the highest priority based on task consumption time of the fixed edge node; and (2) among the other edge nodes, on the premise that an occupancy time sequence of an edge node does not conflict with an occupancy time sequence of another edge node that has a higher priority than the edge node, determining the occupancy time sequence of the edge node in the fixed time interval based on task consumption time of the edge node; updating the service price and the task consumption time of the variable edge node, and comparing the quality of experience of the variable edge node with the qualities of experience of the n fixed edge nodes for priority ranking, where the quality of experience of the variable edge node is computed after each update; and on the premise that an occupancy time sequence of the variable edge node does not conflict with occupancy time sequences of all fixed edge nodes that have higher priorities than the variable edge node, determining the occupancy time sequence of the variable edge node in the fixed time interval based on the task consumption time of the variable edge node.

Figure 3:
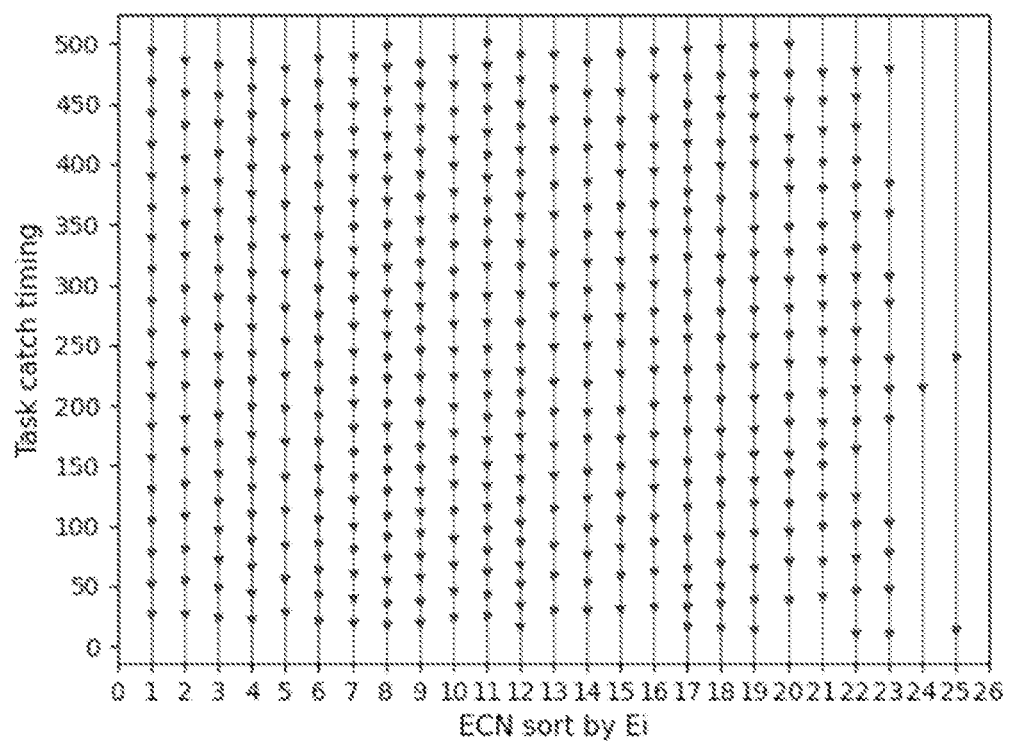
FIG. 3 is a schematic diagram of occupancy time sequences of edge nodes ranked based on priorities.

Referring to FIG. 3, the edge nodes are ranked from 1 to 25 based on priorities; a point on each vertical line denotes an idle moment when a task can be received; and time between two adjacent points is task consumption time.

A service price p of the variable edge node and consumption time t for completing the computing task are generated by using particle swarm optimal searching, to achieve a maximum profit R(p,t).

A computational model of the maximum profit is as follows:

$$\max R(p, t) = (p - C(t)) * \varepsilon(p, t)$$

$$C(t) = \alpha_i^{\ln \frac{\frac{1}{n}\Sigma_i t_i}{t}}$$

$$\text{s.t} \begin{cases} t > t_m \\ p < p_m \end{cases}$$

in the formula, C(t) denotes cost; $\alpha_i$ denotes an inherent performance parameter of hardware of an $i^{th}$ fixed edge node; n denotes a total quantity of fixed edge nodes, where i={1, 2, . . . , n}; $t_i$ denotes task consumption time by which the ith fixed edge node completes the computing task; $\varepsilon(p,t)$ denotes a quantity of tasks received by the variable edge node in the fixed time interval; and a length of the occupancy time sequence of the variable edge node is equal to the quantity $\varepsilon(p,t)$ of the tasks received by the variable edge node in the fixed time interval.

Figure 4:
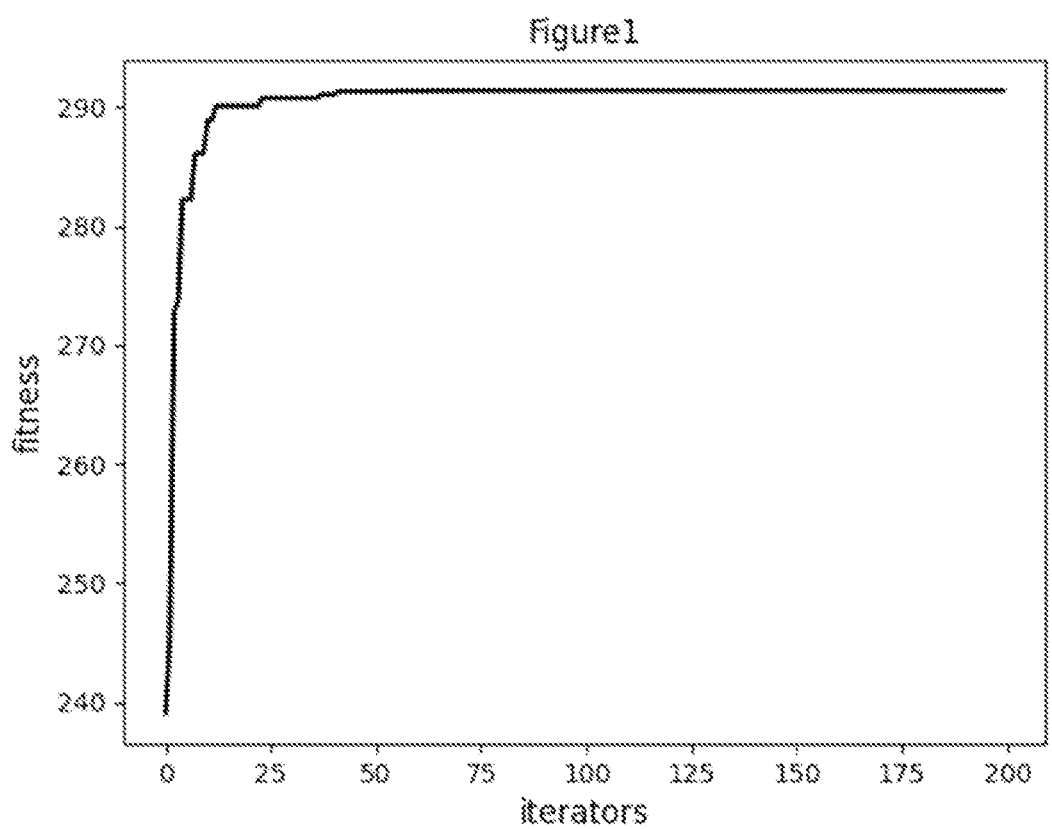
FIG. 4 is an iteration-convergence diagram of a particle swarm optimization algorithm.
Figure 5:
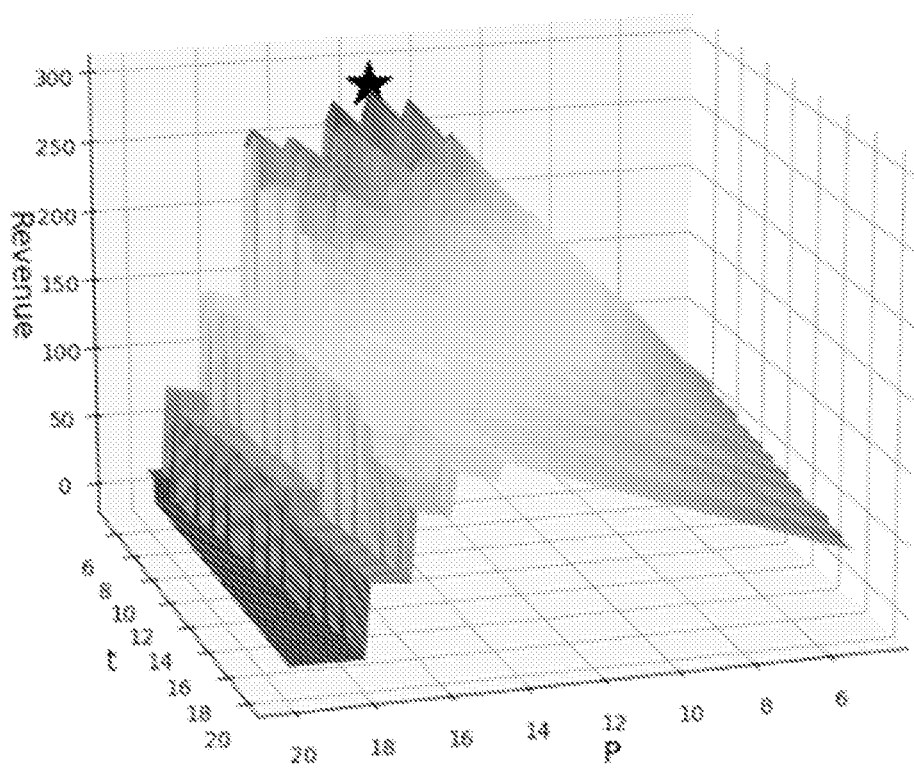
FIG. 5 is a schematic diagram of a result of solving a maximum profit by using a particle swarm optimization algorithm.

Convergence is performed by using a particle swarm optimization algorithm, to acquire optimal values p, t and $\varepsilon(p,t)$ of the variable edge node. For an iteration-convergence diagram of the particle swarm optimization algorithm, refer to FIG. 4. FIG. 5 is a schematic diagram of a result of solving a maximum profit by using a particle swarm optimization algorithm.

2. Embodiments for a Specific Physical Scenario (1) Scenario Settings

Figure 6:
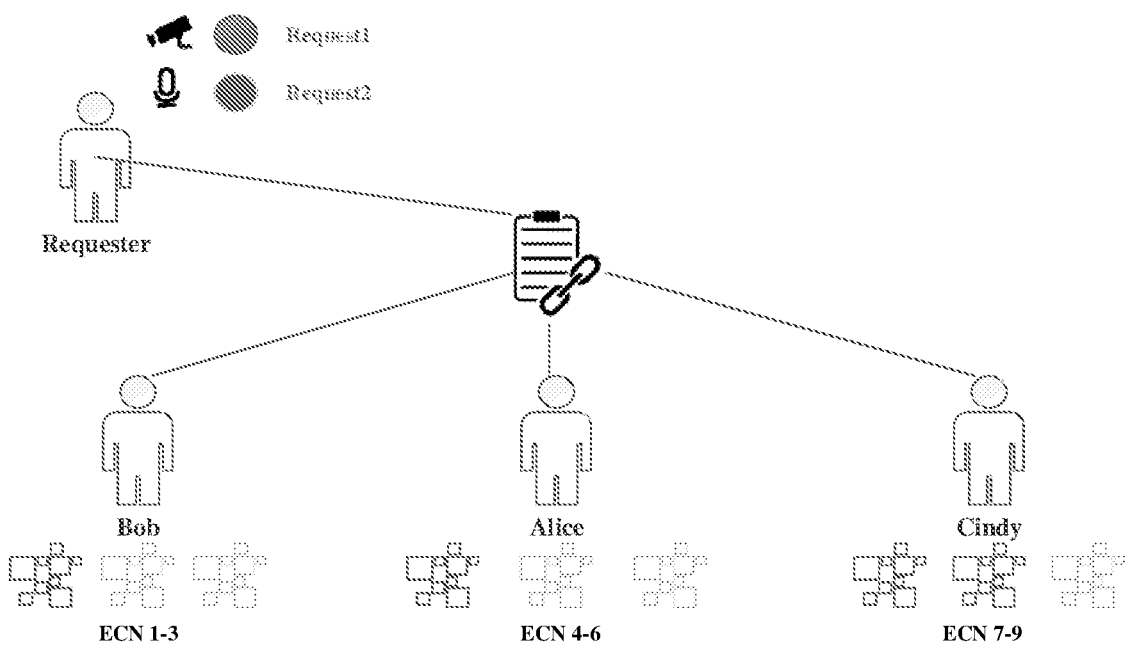
FIG. 6 is a setting diagram of a physical scenario.

It is assumed that there are four users (one requester and three suppliers: Alice, Bob, and Cindy). The suppliers do not know each other previously, and have nine idle devices in total to be used as edge nodes (1 to 9). According to the above definition, one contract has been deployed to the Ethereum in advance, as shown in FIG. 6.

To simplify verification, a program is preloaded to an edge node for a request. Requests are differentiated by using different colors. A request may be generated by any constrained device, and transferred by the requester. Each node can process requests of a same color, but has different execution time for a same request. A service price is automatically generated based on a game algorithm and execution time.

The following main objectives of the method are implemented in this scenario:

Pairing: A request should be capable of automatically finding a most appropriate node and establishing an M2M communications channel.

Computing: A requesting device sends raw data based on a paired node. A node receives and runs a computing program, then feeds back a result, and triggers a contract event at the same time.

Variable analysis: How a resource price and consumption time of a node affect a service rate of the node is inquired based on consecutive requests.

(2) Software Design

Contract design and deployment: Solidity is a high-level programming language oriented to contracts and created to implement smart contracts, thereby being a contract development tool. A contract has three types of contract structural bodies: user, node, and request. A user is bound to a unique Ethereum address. A subordinate node of the user is associated with the address through mapping. The contract is mainly responsible for unification of node information, a fair logic, and automatic asset transfer, but is not responsible for a computing task. A smart contract (at address: 0x2a0dCa2cCe68d40c2523b1A5e2928E47D6249FF3) is deployed on a Ropsten test network; and it is ensured that all users have enough test tokens to pay for possible transactions. Software is installed on a user layer in a content distribution manner.

Task description: The computing task is executed in a same process as conventional edge computing. A program that should be preloaded to a service node needs to be specified before the computing task is started. The program may be a code with a specific function, a general algorithm, an app, or the like. These programs are uniformly named in a system, to facilitate understanding. A protocol code is output after a task of a device is uploaded. Then, the task is pushed to a queue of ECN providers in a uniform format; and an Ethereum event is triggered. Once a task is received, a requester can monitor another Ethereum event; and then issue a protocol code, so that a device can transmit raw data to a target ECN in an M2M manner.

Node description: Corresponding to a task, an edge node packages attributes such as algorithm resource description, a service price, consumption time for completing a computing task, a node name, a node address, an owner, an occupancy state, and the like; and uploads the packaged attributes as registration information during registration.

Communication code: To establish a data transmission channel between heterogeneous nodes, a communication protocol and an identification code should be unified. These pieces of information need to be preset in node description, to facilitate mutual positioning and pairing. For example, a node supporting the Lora protocol is defined as follows: {protocol:Lora; code:[0xC0,0x00,0x06,0xFF,0xFF,0x00, 0x67,0x20,0x3C]}. In this way, an M2M connection can be established by accessing the communications channel.

Interactive interface: As consensus with a network layer, a smart contract needs to restrain a behavior of a physical layer by using an MECaaS. Web3.Py (a Python library issued by the Ethereum foundation) is used for interaction with the smart contract. A deployed contract provides an Ethereum address and an application binary interface (ABI). Each user can invoke a contract function from the MECaaS by using a simple instantiated contract Python script. There is no restriction on a manner in which a user manages a node, provided that information can be pushed from a top layer to a bottom layer, and from the bottom layer to the top layer. A common method for connecting an underlying device to a user may be TCP communication.

Based on design of the MECaaS, all the above processes are fully automatic; and all these codes can be easily transplanted and run in any Python-supporting environment. As mentioned above, the MECaaS may be but is not limited to a PC.

(3) Hardware Deployment

Figure 7:
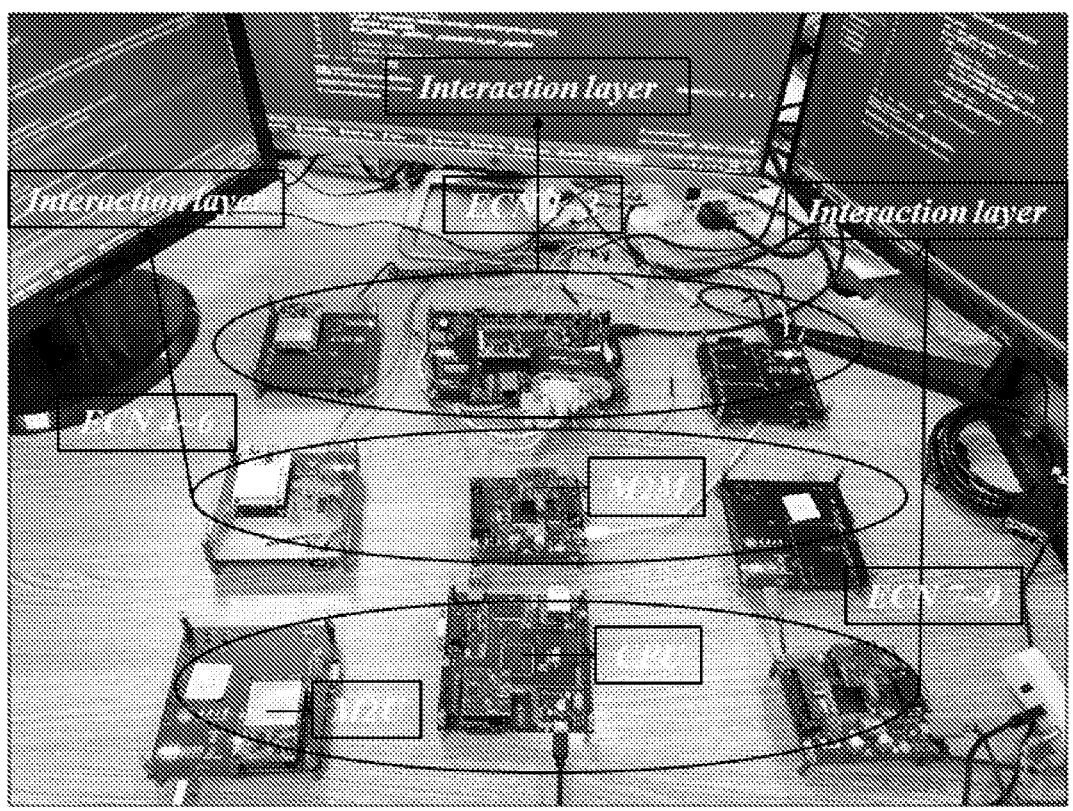
FIG. 7 is a verification diagram of a physical layer.

As shown in FIG. 7, programmable embedded terminals are used to build a physical layer (including ECNs and devices). Each terminal mainly includes a CPU and an M2M module, and is connected to MECaaS through an M2U module. Two typical programs are preset as tasks in a node: character transcoding (GBK-to-UCS2) and gray binarization. An original character and a gray array are fixed to avoid deviation. Pretests for performances of ECNs show that task consumption time of the ECNs ranges from 9 ms to 66 ms. A hardware list is as follows:

| CPU | STM32 F407ZGT6/F429IGT6 |
|---|---|
| M2M module | ZigBee DRF1605H v3.0 |
| M2U module | 4G eDtu_LTE_V47 |

(4) Implementation Result

Figure 8B:
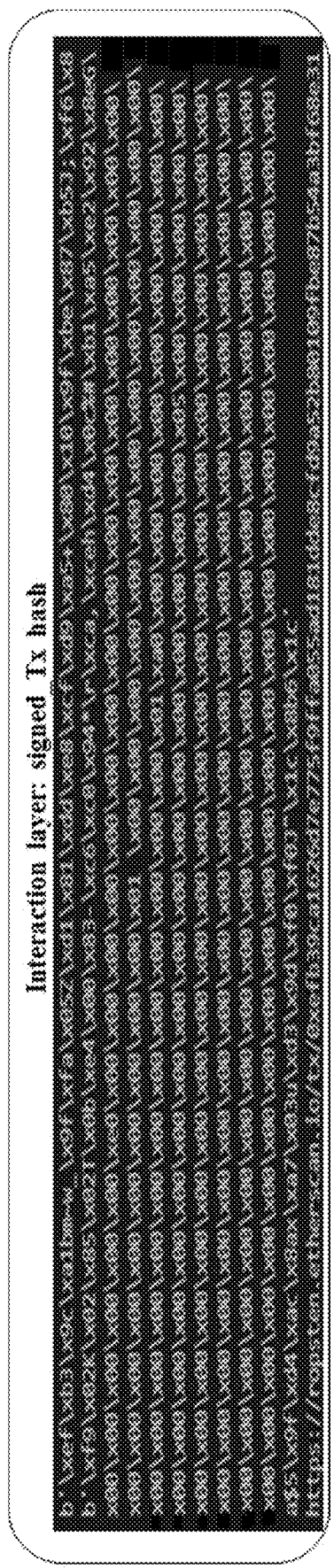
FIG. 8B is a schematic diagram illustrating a specific detail of a transaction hash of MECaaS according to an embodiment of the present disclosure.

As shown in FIGS. 8A-8C, each computing detail can be verified by using a transaction on a blockchain layer, a transaction hash of the MECaaS, and a computing result on a physical layer.

The following describes an impact of a price and time of an ECN on revenue of the ECN. In a given system, a total quantity of requests is generated based on fixed time weight Wt, fixed price weight Wp, and time unit T. An ECN cannot process a plurality of tasks in parallel. All ECNs that receive requests confirm the requests immediately, and complete services for T times in time, where T corresponds to a task, as shown in FIG. 6.

It can be learned that as time and a price of a single ECN decrease, a quantity of services received by the ECN increases rapidly. As a result, an ECN that consumes too much time and that is overpriced cannot receive services due to market saturation.

A time index and a price index affect a weighted criterion of a requester, which is reflected in a service trend that changes with Wt and Wp. In addition, a higher processing speed leads to more opportunities for capturing requests; and a lower price may lead to an increased quantity of services at the expense of a decreased profit. Therefore, an ECN having a relatively high computing speed is more dominant in a system. Certainly, when a quantity of requests is large enough, a possibility of forming an oligopoly effect is low, and most ECNs can still capture requests in the market.

The method is designed for various heterogeneous devices with constrained resources, has a high capability of integration and high expansibility, and can be adaptive to most computing scenarios of IoT devices. Execution of the method is independent of any centralized controller and any central computing node. Compared with a conventional solution, an autonomous decision-making algorithm is designed individually by the method; and an IoT body is enabled in an SaaS mode, thereby building a fully distributed system.

What is claimed is:

1. A blockchain-based interaction method for an edge computing service, comprising the following steps:
   deploying a smart contract on a blockchain layer, wherein the smart contract is used to uniformly name preloaded programs, provide a uniform format for registration information of edge nodes, and provide a fair logic and an automatic asset transfer service;

using, as a bearing entity of a multi-access edge computing as a service (MECaaS), a device that has an environment for an operating system and that is of a user;

registering a computing power device of the user as an edge node (ECN) by using the MECaaS; and uploading or updating registration information of the edge node in a uniform format to the blockchain layer, wherein the registration information comprises a node name, a node address, a service price, and task consumption time;

issuing, by a requesting device as a data producer, a computing task to the MECaaS, wherein the computing task comprises a name of a preloaded program, an address of the requesting device, delay sensitivity, and cost sensitivity;

invoking, by the MECaaS, the smart contract; standardizing a data format of the computing task; and matching a target edge node for the requesting device by using a distributed decision-making algorithm;

pushing the standardized computing task to a task queue of the target edge node;

triggering an Ethereum event at the same time; and instructing the target edge node to confirm the Ethereum event;

after the event is confirmed, triggering another Ethereum event; and issuing, by the requesting device, a communication code to the target edge node by using the MECaaS, to establish a Machine-to-Machine (M2M) communication between the requesting device and the target edge node;

transmitting, by the requesting device, raw data to the target edge node by using the M2M communication; and searching for and loading, by the target edge node, the preloaded program based on the name of the preloaded program; executing the preloaded program to perform computing on the raw data; feeding back a computing result to the requesting device;

and triggering a contract event at the same time.

2. The blockchain-based interaction method for an edge computing service according to claim 1, wherein the distributed decision-making algorithm comprises the following steps: acquiring, by the requesting device, registration information of edge nodes by using the MECaaS based on the delay sensitivity and the cost sensitivity of the computing task; computing qualities of experience of the edge nodes; and automatically selecting, as the target edge node, an edge node with the best quality of experience from edge nodes whose occupancy states are idle.

3. The blockchain-based interaction method for an edge computing service according to claim 2, wherein the quality of experience is computed according to the following formula: $E=\lambda_r^T *t+\lambda_r^C *p$, wherein E denotes a quality of experience provided by an edge node; $\lambda_r^T$ and $\lambda_r^C$ respectively denote the delay sensitivity and the cost sensitivity of the computing task; $\lambda_r^T$ and $\lambda_r^C$ are both constants; t denotes task consumption time by which the edge node completes the computing task; and p denotes a service price of the edge node.

4. The blockchain-based interaction method for an edge computing service according to claim 3, wherein there are (n+1) edge nodes in total; the nth edge node is used as a fixed edge node; one of the other edge nodes is used as a variable edge node; a service price and task consumption time of the fixed edge node are fixed; a service price and task consumption time of the variable edge node are optimized to achieve a maximum profit; both the fixed edge node and the variable edge node have the potential to be selected as a target edge node when being in an idle state; whether an edge node is in the idle state is determined based on an occupancy time sequence of the edge node in a fixed time interval; and each moment in the occupancy time sequence of the edge node is an idle moment.

5. The blockchain-based interaction method for an edge computing service according to claim 4, wherein the occupancy time sequence of the edge node in the fixed time interval is computed in the following manner:

if task consumption time of any edge node is not an integral multiple of a task period, rounding up the task consumption time to an integer multiple of the task period;

specifying service prices and task consumption time of n fixed edge nodes;

computing corresponding qualities of experience, wherein a lower quality of experience indicates a higher priority; and ranking the n fixed edge nodes based on the qualities of experience;

determining occupancy time sequences of the n fixed edge nodes in a same fixed time interval according to the following principles:

(1) determining an occupancy time sequence, in the fixed time interval, of a fixed edge node with the highest priority based on task consumption time of the fixed edge node; and (2) among the other edge nodes, on the premise that an occupancy time sequence of an edge node does not conflict with an occupancy time sequence of another edge node that has a higher priority than the edge node, determining the occupancy time sequence of the edge node in the fixed time interval based on task consumption time of the edge node;

updating the service price and the task consumption time of the variable edge node, and comparing the quality of experience of the variable edge node with the qualities of experience of the n fixed edge nodes for priority ranking, wherein the quality of experience of the variable edge node is computed after each update; and on the premise that an occupancy time sequence of the variable edge node does not conflict with occupancy time sequences of all fixed edge nodes that have higher priorities than the variable edge node, determining the occupancy time sequence of the variable edge node in the fixed time interval based on the task consumption time of the variable edge node.

6. The blockchain-based interaction method for an edge computing service according to claim 5, wherein a service price p of the variable edge node and consumption time t for completing the computing task are generated by using a particle swarm optimization algorithm, to achieve a maximum profit R(p,t).

7. The blockchain-based interaction method for an edge computing service according to claim 6, wherein a computational model of the maximum profit is as follows:

$$\max R(p, t) = (p - C(t)) * \varepsilon(p, t)$$

$$C(t) = \alpha_i^{\ln \frac{\frac{1}{n}\Sigma_i t_i}{t}}$$

$$s.t \begin{cases} t > t_m \\ p < p_m \end{cases}$$

in the formula, C(t) denotes cost; $\alpha_i$ denotes an inherent performance parameter of hardware of an ith fixed edge node; n denotes a total quantity of fixed edge nodes, wherein i={1, 2, . . . , n}; $t_i$ denotes task consumption time by which the ith fixed edge node completes the computing task; ε(p,t) denotes a quantity of tasks received by the variable edge node in the fixed time interval; and a length of the occupancy time sequence of the variable edge node is equal to the quantity ε(p,t) of the tasks received by the variable edge node in the fixed time interval.

8. A blockchain-based interaction system for an edge computing service, comprising a blockchain layer, a physical layer, and a multi-access edge computing as a service (MECaaS), wherein the blockchain layer and the physical layer are linked and coordinated by using the MECaaS;

wherein the physical layer comprises an Internet of Things (IoT) formed by various devices of different users, wherein devices of each user are classified into function-constrained devices and computing power devices;

wherein the blockchain layer comprises Ethereum used to support development of a smart contract, wherein the smart contract is deployed, through the Ethereum, to a blockchain network formed by distributed blocks;

wherein a device that has an environment for an operating system and that is of a user is used as a bearing entity of the MECaaS, wherein the MECaaS is configured to provide operation access, so that a user can register his/her computing power device as an edge node, and upload information about the edge node to the blockchain network for storage; and the MECaaS is further configured to: invoke, from the blockchain layer, a pre-deployed smart contract that meets a functional requirement; standardize the edge node by using the smart contract; request a naming-addressing protocol by using the smart contract; manage a transaction process of an edge computing service by using the smart contract; and finally, automatically match a target edge node for a requesting device according to a standardized computing task by using a distributed decision-making algorithm, and establish an M2M communication between the requesting device and the target edge node, so that the requesting device can transmit raw data to the target edge node, and the target edge node can feed back a computing result to the requesting device; and wherein the MECaaS is further configured to configure and execute the distributed decision-making algorithm; the distributed decision-making algorithm comprises the following steps: acquiring, by the requesting device, registration information of edge nodes by using the MECaaS based on delay sensitivity and cost sensitivity of the computing task; computing qualities of experience of completing the computing task; and automatically selecting, as the target edge node, a registered edge node with the best quality of experience.

* * * * *